May 17, 1927.

L. DE FOREST 1,629,152

SLOT CLEANER FOR MOTION PICTURE MACHINES

Original Filed April 28, 1923

Inventor
Lee De Forest
By his Attorneys
Darby & Darby

Patented May 17, 1927.

1,629,152

UNITED STATES PATENT OFFICE.

LEE DE FOREST, OF NEW YORK, N. Y., ASSIGNOR TO DE FOREST PHONOFILM CORPORATION, OF NEW YORK, N. Y., A CORPORATION OF DELAWARE.

SLOT CLEANER FOR MOTION-PICTURE MACHINES.

Original application filed April 28, 1923, Serial No. 635,331. Divided and this application filed December 20, 1924. Serial No. 757,115.

This application is a division of my application Serial No. 635,331, filed April 28, 1923.

The invention relates to means for cleaning light slots in motion picture machines for recording and reproducing sound such as a projector or camera, which is simple and efficient in operation and economic in manufacture.

The further object of the invention is to provide means which will permit of the cleaning of the light slot in motion picture apparatus for recording and reproducing sound which may be operated during the operation of such apparatus.

Further objects of the invention will appear more fully hereinafter.

The invention consists substantially in the construction, combination, location and relative arrangement of parts, all as will be more fully hereinafter set forth, as shown by the accompanying drawing and finally pointed out in the appended claims.

Referring to the drawing.

The same part is designated by the same reference character wherever it occurs throughout the several views.

In the practical operation of motion picture machines, such as projectors or cameras, and especially in such types of machine which are employed for photographic sound waves, it is customary for the light from the source thereof to pass through what is termed in the art "a light slot or slit" past which the film is moved. Due to the fact that this slot or slit must of necessity be of extremely small size, especially in the talking moving picture art, and the further fact that the film in its transit through the machine picks up and carries therewith fine dust specks and other extraneous material, one source of difficulty has been that the light slot or slit has become clogged thereby impairing the efficiency of the machine in the motion picture photography art, causing the detector imperfect recording or reproduction, etc.

It is the special purpose of my present invention to provide a simple and efficient means for overcoming this difficulty, among others, and to provide a light slot or slit structure, or means arranged therewith, to prevent same from becoming clogged, or to permit the cleaning thereof during the operation of the machine.

The principles of my invention may be accomplished in one of the following ways, and while I will show and describe the arrangements modifying the principles of my invention, I wish it to be understood that I do not wish it to be limited or restricted thereto as many other arrangements will readily occur to those skilled in the art without departing from the spirit and scope of my invention as defined in the claims.

Figure 1:
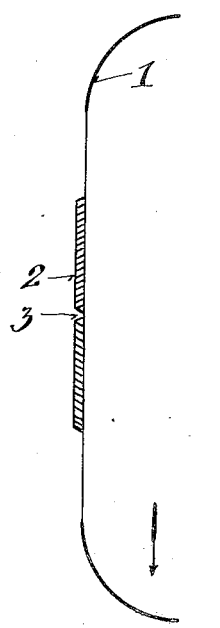
Figure 1 shows diagrammatically in elevation of a structure section of a light slot or slit such as is commonly embodied in motion picture apparatus adapted to record and reproduce sound.

Referring to the drawing and more particularly to Fig. 1, the reference character 1 designates the film which is caused to travel in the usual well known manner in the direction indicated by the arrow and the same is caused to pass by a light slot or slit which in this instance is customary and formed in a plate by means of the V cut therein, as indicated at 3 with the film passing on the back side of the plate 2 in contact therewith whereby it passes by the apex aperture of the V cut 3.

Figure 2:
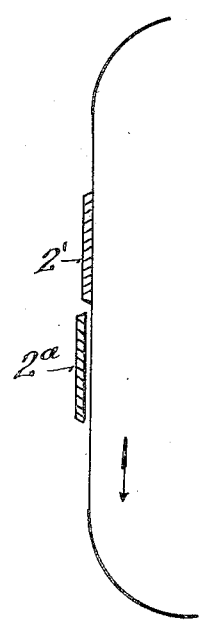
Fig. 2 is the same view, showing a light slot constructed in accordance with the principles of my invention.

It is with this type of light slot or slit that the dust, dirt or other extraneous material carried by the film 1 clogs up the slot or slit formed by the V 3. In Fig. 2 I have shown one simple arrangement embodied in my invention for overcoming this difficulty, wherein I form the light slot plate into portions 2' and 2ª, and offset laterally the plate 2ª relative to plate 2'.

It will be apparent that with this arrangement it is impossible for dirt, dust or the like to accumulate at the slot and of course plate 2ª may be offset practically an infinitesimal distance whereby the purpose of my invention may be accomplished. To offer a clear showing thereof, however, in Fig. 2, the plate 2ª has been moved a considerable distance laterally to the plate 2'.

I do not desire to limit the embodiment of two separate plates 2' and 2ª, for it is obvious that the position 2ª of a single plate may be offset or displaced by mounting or other operation to effect the same result.

Having now set forth the objects and nature of my invention, and having shown and described the arrangements modifying the principles thereof, what I claim as new and useful and of my own invention and desire to secure by Letters Patent is:

1. Means for maintaining the light aperture of motion picture machines for recording and reproducing sound unobstructed by dust, dirt, or the like, which consists of two members which form an aperture one member being offset from the other.

2. Means for maintaining the light aperture of motion picture machines for recording and reproducing sound unobstructed by dust, dirt, or the like which consists of two plates which form an aperture one plate being offset from the other and out of contact with the film.

3. Means for maintaining the light aperture of motion picture machines for recording and reproducing sound unobstructed by dust, dirt, or the like, which consists of two members which form an aperture and the member passed last by the film in its travel, being offset with respect to the other and out of contact with the film.

In testimony whereof I have hereunto set my hand on this 12th day of December A. D., 1924.

LEE DE FOREST.